7936X
A. RANSOM.
Coffee Roaster.
Patented Dec. 31, 1833.
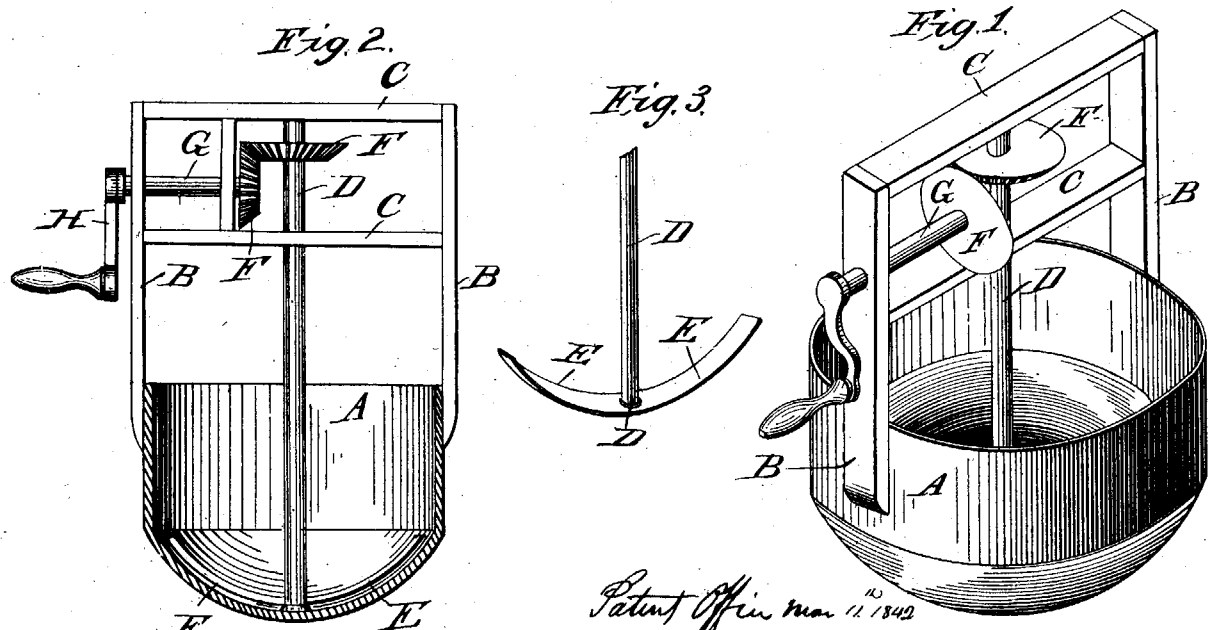
Patent Office Mar 12 1842
Made under the direction of the Commissioner of Patents
in conformity with act of Congress 3 March 1837.
H. L. Ellsworth
Commissioner of Patents.
THE NORRIS PETERS CO., PHOTO-LITHO., WASHINGTON, D. C.

14361X Dec. 31. 1833

[illegible] Ransom of Hartford, Connecticut

Letters Patent

The schedule referred to in these letters patent and making a
part of the same containing a description in the words of the said
Amos Ransom, himself of his improvement in the machine for
roasting Coffee To all to whom these presents shall come.
Be it known that I Amos Ransom of the town of Hartford &
the county of Hartford and State of Connecticut have invented
a new and useful improvement in a machine for roasting Coffee,
and that the following is a full and exact description of the con-
struction and operation of the said Machine as invented and
improved by me, The body consists of a circular pan or kettle
of suitable size, say eight inches or more in diameter, with
a concave bottom the edge of which rises twenty five or thirty
degrees from the centre. To the sides of the kettle two upright
posts are attached directly opposite to each other, extending above
the pan and connected by two horizontal braces, one at the
top of the kettle and the other connecting the top of the posts
through the centre of these horizontal braces, an upright shaft
is placed with the lower end resting on the bottom of the
kettle on this shaft and so near the bottom as to prevent a
grain of coffee from passing under them, are placed two wings
opposite each other and inch and a half in width, and long
enough to extend to the side of the kettle near the top of this
shaft, and on the same is placed a horizontal wheel, with
gearing arranged to match with a perpendicular wheel placed
on a short horizontal shaft passing through one of the perpendic-
ular posts first mentioned and a short upright post [illegible]
the two [illegible] [illegible] [illegible] perpendicular shaft [illegible]

On the outer end of the horizontal shaft, is fixed a crank for the purpose of turning the shaft, to which the knives are affixed, or the same may be turned by a balance weight.

My improvement consists in the application of the knives by the aforesaid described machinery to the purposes aforesaid, and it is for such improvement I obtain this improvement. The annexed design and explanatory may be referred to as exhibiting more perfectly my improvement.

Wm. W. Ellsworth } Witness
Erastus Smith

Amos Ransom,

[illegible] [illegible]